US012620316B2

(12) United States Patent
Wang et al.

(10) Patent No.: US 12,620,316 B2
(45) Date of Patent: May 5, 2026

(54) SYSTEMS AND METHODS FOR DETERMINING VEHICLE ROUTES FOR TRIP OPTIMIZATION

(71) Applicant: Walmart Apollo, LLC, Bentonville, AR (US)

(72) Inventors: Yu Wang, Issaquah, WA (US); Shixiang Luo, Sunnyvale, CA (US); Ou Sun, Rancho Santa Margarita, CA (US); Yiru Wen, San Jose, CA (US); Lijie Wan, Mountain View, CA (US); Jing Huang, San Jose, CA (US); Mingang Fu, Palo Alto, CA (US); Ishaan Das, San Jose, CA (US); Toshi Prakash, Bangalore (IN)

(73) Assignee: WALMART APOLLO, LLC, Bentonville, AR (US)

( * ) Notice: Subject to any disclaimer, the term of this patent is extended or adjusted under 35 U.S.C. 154(b) by 79 days.

(21) Appl. No.: 18/428,828

(22) Filed: Jan. 31, 2024

(65) Prior Publication Data

US 2025/0246078 A1 Jul. 31, 2025

(51) Int. Cl.
*G08G 1/00* (2006.01)

(52) U.S. Cl.
CPC .................................... *G08G 1/202* (2013.01)

(58) Field of Classification Search
CPC ...................................................... G08G 1/202
See application file for complete search history.

(56) References Cited

U.S. PATENT DOCUMENTS 7,844,691 B2 11/2010 Gopalakrishnan
2017/0177745 A1* 6/2017 Sheng et al. ............ G06F 30/00
(Continued)

FOREIGN PATENT DOCUMENTS

CN 114779758 A * 7/2022 ........... G05D 1/0221
TW 201708996 A * 3/2017 ............ G08G 1/202
(Continued)

OTHER PUBLICATIONS

Liu, Yanchao., An optimization-driven dynamic vehicle routing algorithm for on-demand meal delivery using drones. Computers & Operations Research. 111. 10.1016/j.cor.2019.05.024. 2019.
(Continued)

*Primary Examiner* — Helal A Algahaim
(74) *Attorney, Agent, or Firm* — FOLEY & LARDNER LLP

(57) ABSTRACT

Systems and methods including one or more processors and one or more non-transitory storage devices storing computing instructions configured to run on the one or more processors and perform: receiving input information for generating one or more routes for one or more vehicles, the input information including one or more group classifiers; processing the input information based on the one or more group classifiers; analyzing, using one or more solving engines, the input information to generate the one or more routes for the one or more vehicles; selecting, from each of the one or more solving engines, a vehicle route from the one or more routes that satisfies a threshold; and transmitting the vehicle route to a dispatcher to facilitate coordinating, by the dispatcher, operation of a vehicle from the one or more vehicles along the vehicle route. Other embodiments are disclosed herein.

20 Claims, 7 Drawing Sheets

(56) References Cited

U.S. PATENT DOCUMENTS

| | | | |
|---|---|---|---|
| 2019/0114587 | A1 | 4/2019 | Asifullah et al. |
| 2020/0401650 | A1 | 12/2020 | Chen et al. |

FOREIGN PATENT DOCUMENTS

| | | | | | |
|---|---|---|---|---|---|
| WO | WO-2020194062 | A1 * | 10/2020 | ............. | G08G 1/202 |
| WO | WO-2021163160 | A1 * | 8/2021 | ............. | G08G 1/148 |
| WO | WO-2023059994 | A1 * | 4/2023 | ............. | G06Q 10/06 |

OTHER PUBLICATIONS

Barir, H., Route Planner App: Optimizing Multi Stop Deliveries. Retrieved from: https://www.bringg.com/blog/dispatching/delivery-route-planner-app-what-you-need-know/ 2021.

RickSpan—Validating Model Inputs: How Much Is Enough?, Retrieved from: https://riskspan.com/validating-model-inputs-model-risk-management/ 2016.

* cited by examiner

400

SYSTEMS AND METHODS FOR DETERMINING VEHICLE ROUTES FOR TRIP OPTIMIZATION

TECHNICAL FIELD

This disclosure relates generally to computing system management, and more particular to systems and methods for determining vehicle routes for trip optimization to deliver order packages.

BACKGROUND

At least some known systems and industries provide delivery services to their customers. For example, some companies in various industries provide the delivery of goods to their customers, such as the delivery of grocery items by grocers. In particular, the delivery of grocery items has increasingly become a method by which consumers obtain their grocery needs. To deliver goods, many of these companies employ delivery systems that include delivery vehicles. The delivery systems may include the scheduling and assignment of delivery orders to delivery vehicles. For example, a customer that purchases grocery items online may have the grocery items delivered to their home in a delivery vehicle. As the number of delivery orders increase, the determination of delivery routes, along with delivery costs, may increase as well. As such, there are opportunities to improve delivery systems and, in particular, to improve route assignments in a goods delivery system.

BRIEF DESCRIPTION OF THE DRAWINGS

To facilitate further description of the embodiments, the following drawings are provided in which.

Figure 1:
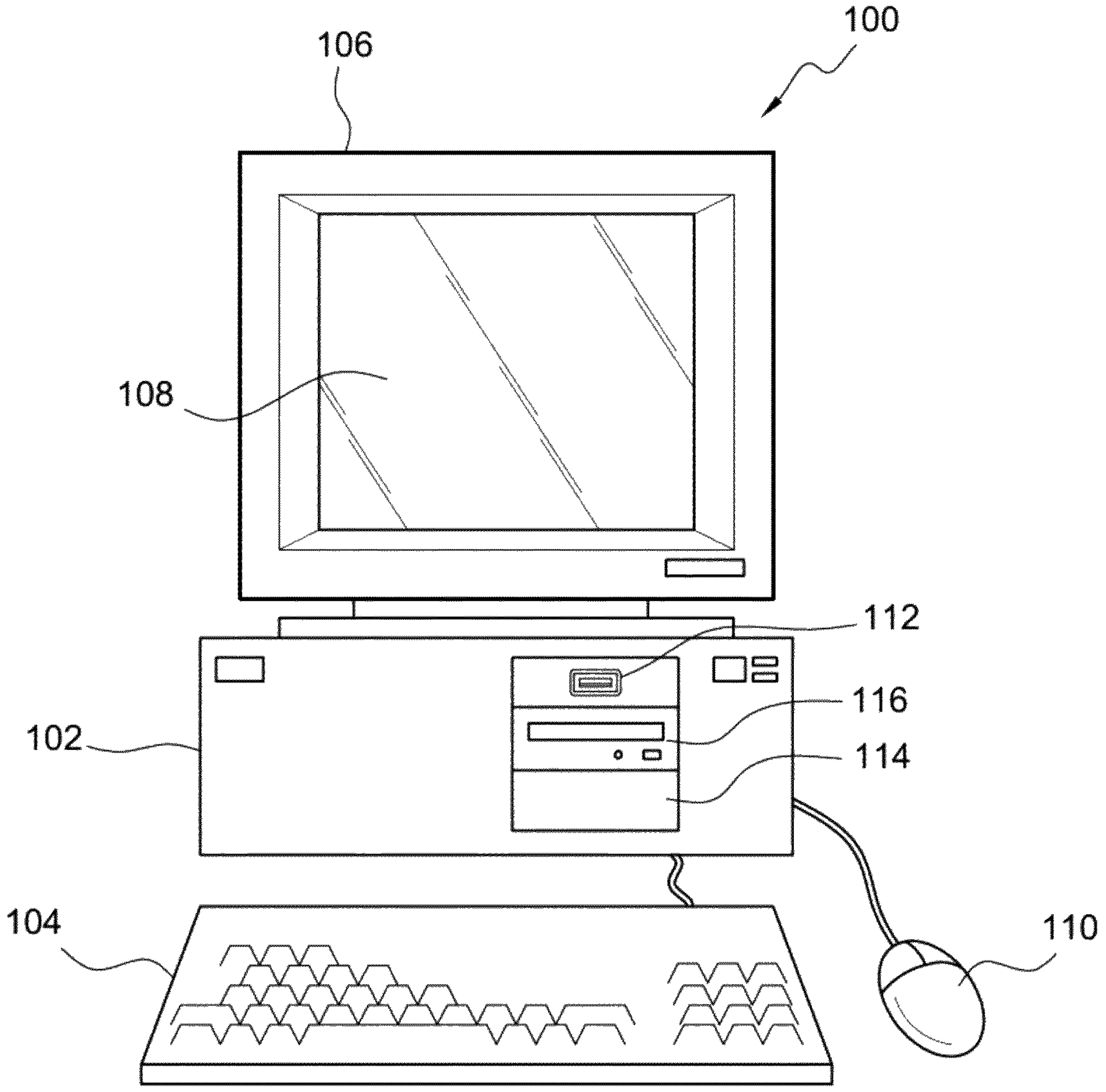
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform: receiving input information for generating one or more routes for one or more vehicles, the input information including one or more group classifiers; processing the input information based on the one or more group classifiers; analyzing, using one or more solving engines, the input information to generate the one or more routes for the one or more vehicles; selecting, from each of the one or more solving engines, a vehicle route from the one or more routes that satisfies a threshold; and transmitting the vehicle route to a dispatcher to facilitate coordinating, by the dispatcher, operation of a vehicle from the one or more vehicles along the vehicle route.

Various embodiments include a method. The method can be implemented via execution of computing instructions configured to run at one or more processors and configured to be stored at non-transitory computer-readable media. The method can comprise receiving input information for generating one or more routes for one or more vehicles, the input information including one or more group classifiers; processing the input information based on the one or more group classifiers; analyzing, using one or more solving engines, the input information to generate the one or more routes for the one or more vehicles; selecting, from each of the one or more solving engines, a vehicle route from the one or more routes that satisfies a threshold; and transmitting the vehicle route to a dispatcher to facilitate coordinating, by the dispatcher, operation of a vehicle from the one or more vehicles along the vehicle route.

Figure 2:
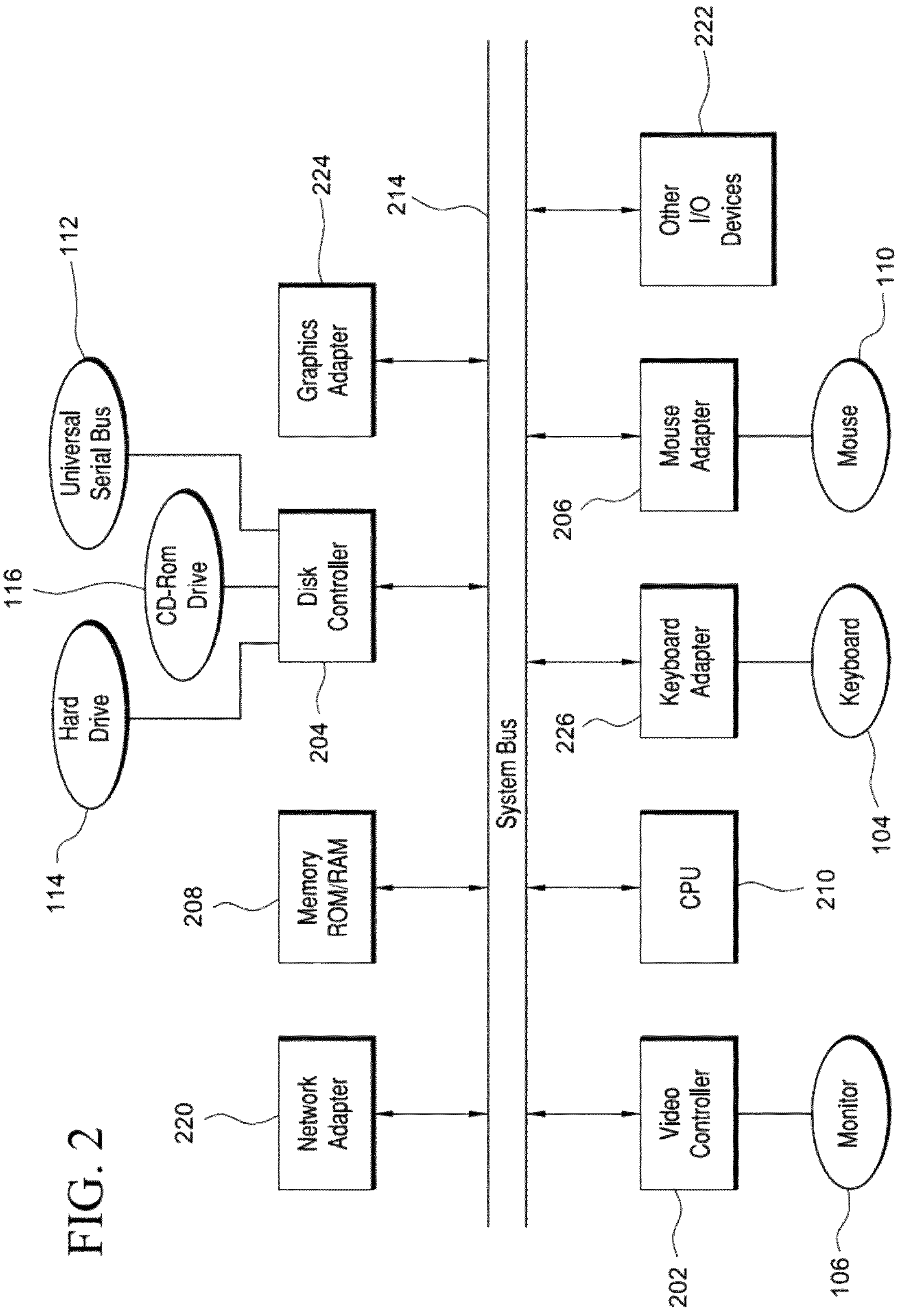
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
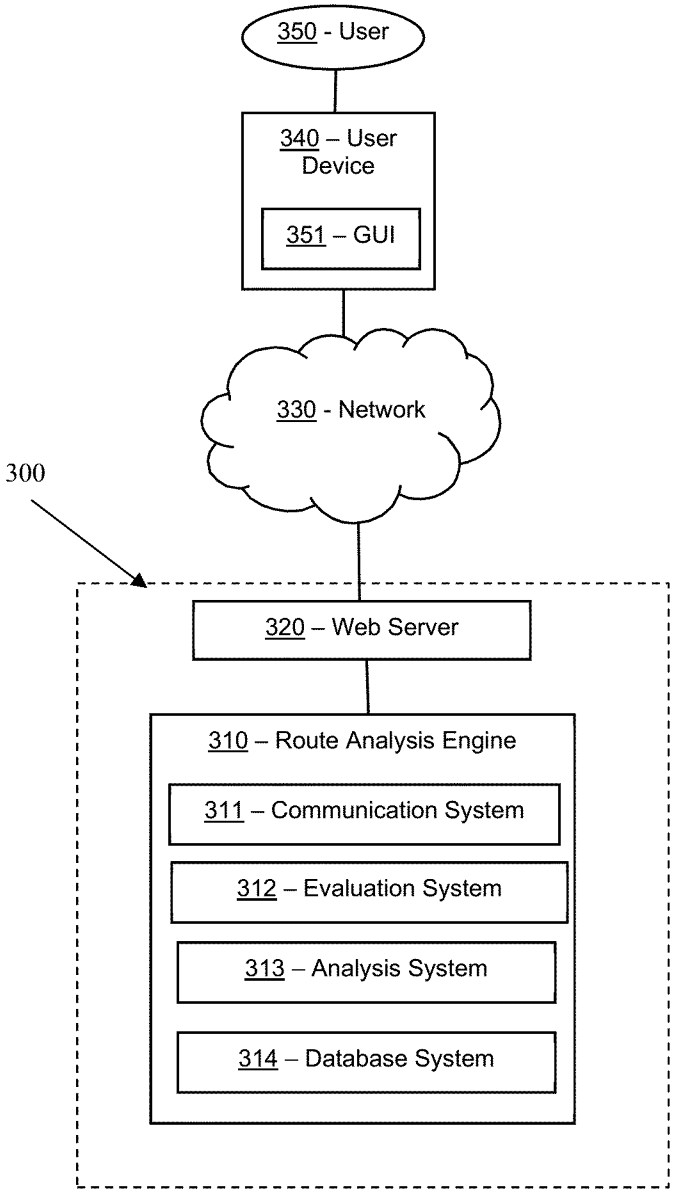
FIG. 3 illustrates a representative block diagram of a system, according to an embodiment.

Turning ahead in the drawings, FIG. 3 illustrates a block diagram of a system 300 that can be employed for vehicle route analysis, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a route analysis engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Route analysis engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host route analysis engine 310 and/or web server 320. Additional details regarding route analysis engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with route analysis engine 310, in addition to other suitable activities. In a number of embodiments, web server 320 can interface with route analysis engine 310 when a user (e.g., 350) is viewing infrastructure components in order to assist with the analysis of the infrastructure components for determining a vehicle route.

In some embodiments, an internal network that is not open to the public can be used for communications between route analysis engine 310 and web server 320 within system 300. Accordingly, in some embodiments, route analysis engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, route analysis engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to route analysis engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of route analysis engine 310 and/or web server 320. In a similar manner, the processors and/or the non-transitory computer-readable media can be local and/or remote to each other.

Meanwhile, in many embodiments, route analysis engine 310 and/or web server 320 also can be configured to communicate with one or more databases, such as a database system 314. The one or more databases can include vehicle route information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, route analysis engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, route analysis engine 310 can include a communication system 311, an evaluation system 312, an analysis system 313, and/or database system 314. In many embodiments, the systems of route analysis engine 310 can be modules of computing instructions (e.g., software modules) stored at non-transitory computer readable media that operate on one or more processors. In other embodiments, the systems of route analysis engine 310 can be implemented in hardware. route analysis engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host route analysis engine 310 and/or web server 320. Additional details regarding route analysis engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user devices 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, route analysis engine 310, and/or web server 320 can be configured to communicate with one or more user devices 340. In some embodiments, user devices 340 also can be referred to as customer computers. In some embodiments, route analysis engine 310, and/or web server 320 can communicate or interface (e.g., interact) with one or more customer computers (such as user devices 340) through a network 330. Network 330 can be an intranet that is not open to the public. In further embodiments, network 330 can be a mesh network of individual systems. Accordingly, in many embodiments, route analysis engine 310, and/or web server 320 (and/or the software used by such systems) can refer to a back end of system 300 operated by an operator and/or administrator of system 300, and user device 340 (and/or the software used by such systems) can refer to a front end of system 300 used by one or more users 350, respectively. In some embodiments, users 350 can also be referred to as customers, in which case, user device 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Figure 4:
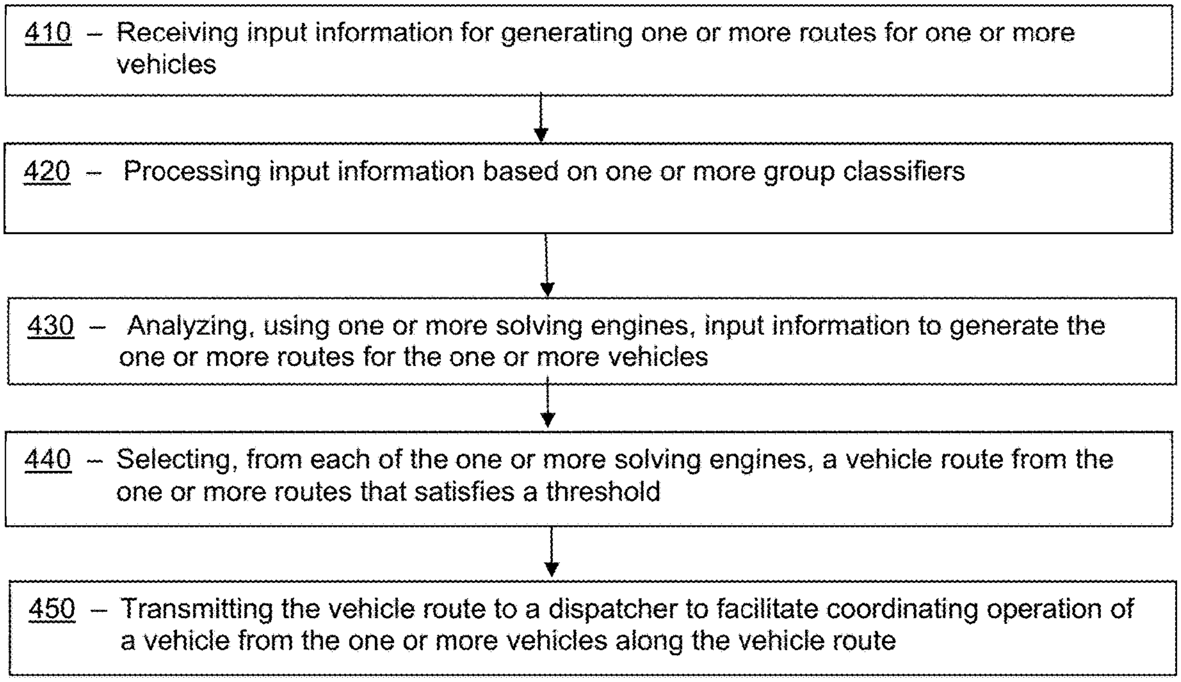
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as route analysis engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving input information for generating one or more routes for one or more vehicles. In some embodiments, the input information includes order information (e.g., order type, cost coefficient, delivery location & time window, etc.), vehicle information (e.g., capacity, fleet size, base location, operation time window, operational rules, etc.), and store information (e.g., location). In some embodiments, the input information includes one or more group classifiers. In some embodiments, the one or more group classifiers corresponds to a delivery type for one or more orders. In some embodiments, the one or more group classifiers can include in-home, chaining, or dynamic batching.

In many embodiments, method 400 can comprise an activity 420 of processing the input information based on the one or more group classifiers. In some embodiments, processing the input information based on the one or more group classifiers comprises validating the input information. For example, activity 420 analyzes the input information and performs a validation such as data format validation (e.g., enough data is present, the data is in a proper data format, etc.) to ensure the information can be processed using one or more optimizer engines. In some embodiments, processing the input information based on the one or more group classifiers comprises selecting one or more optimizer engines to process the input information based on the one or more group classifiers. In some embodiments, each of the one or more optimizer engines is configured to process a group classifier from the one or more group classifiers. For example, an in-home optimizer engine is configured to process input information that includes an in-home group classifier.

In many embodiments, method 400 can comprise an activity 430 of analyzing, using one or more solving engines, the input information to generate the one or more routes for the one or more vehicles. In some embodiments, the one or more solving engines includes at least one of an Adaptive Large Neighborhood Search (ALNS) solver, an optimization solver, or a generic neighborhood search solver. In some embodiments, the ALNS solver includes a destroy operator and a repair operator. In one example, a first solver is ALNS solver, a second solver is an ORTools based solver, and a third solver is a generic neighborhood search solver. In some embodiments, each solver produces an output based on the analysis of the input information. For example, each solver can produce one or more vehicle routes based on the input information. In some embodiments, the one or more solving engines are operated in parallel. That is, the one or more solving engines are initiated at a same start time.

In some embodiments, analyzing the input information to generate the one or more routes for the one or more vehicles comprises receiving vehicle routes from each of the one or more solving engines. In some embodiments, analyzing the input information to generate the one or more routes for the one or more vehicles comprises comparing the vehicle routes from each of the one or more solving engines to select a vehicle route from the one or more routes that satisfies a threshold. In some embodiments, the threshold corresponds to a solving engine of the one or more solving engines that produced: (a) the vehicle route fastest, or (b) a vehicle route that utilizes a least amount of resources.

In many embodiments, method 400 can comprise an activity 440 of selecting, from each of the one or more solving engines, a vehicle route from the one or more routes that satisfies a threshold. In some embodiments, activity 440 determines the vehicle route based on a comparison between the outputs for each solving engine. In some embodiments, the threshold corresponds to a solving engine of the one or more solving engines that produced: (a) the vehicle route fastest, or (b) a vehicle route that utilizes a least amount of resources. For example, the comparison determines which solving engine produced a vehicle route the fastest, and/or which vehicle route utilizes the least amount of resources (e.g., requires the least amount of vehicles).

In many embodiments, method 400 can comprise an activity 450 of transmitting the vehicle route to a dispatcher to facilitate coordinating, by the dispatcher, operation of a vehicle from the one or more vehicles along the vehicle route. In some embodiments, transmitting the vehicle route to a dispatcher to facilitate coordinating the operation of the vehicle from the one or more vehicles along the vehicle route comprises generating a plurality of vehicle routes for the one or more vehicles. In some embodiments, transmitting the vehicle route to a dispatcher to facilitate coordinating the operation of the vehicle from the one or more vehicles along the vehicle route comprises transmitting the plurality of vehicle routes to the dispatcher to facilitate generating, by the dispatcher, a scheduling of vehicles for each of the one or more vehicles to operate along the plurality of vehicle routes. In some embodiments, the scheduling includes identifying which vehicles are going to which stores to retrieve/delivery one or more orders.

Figure 5:
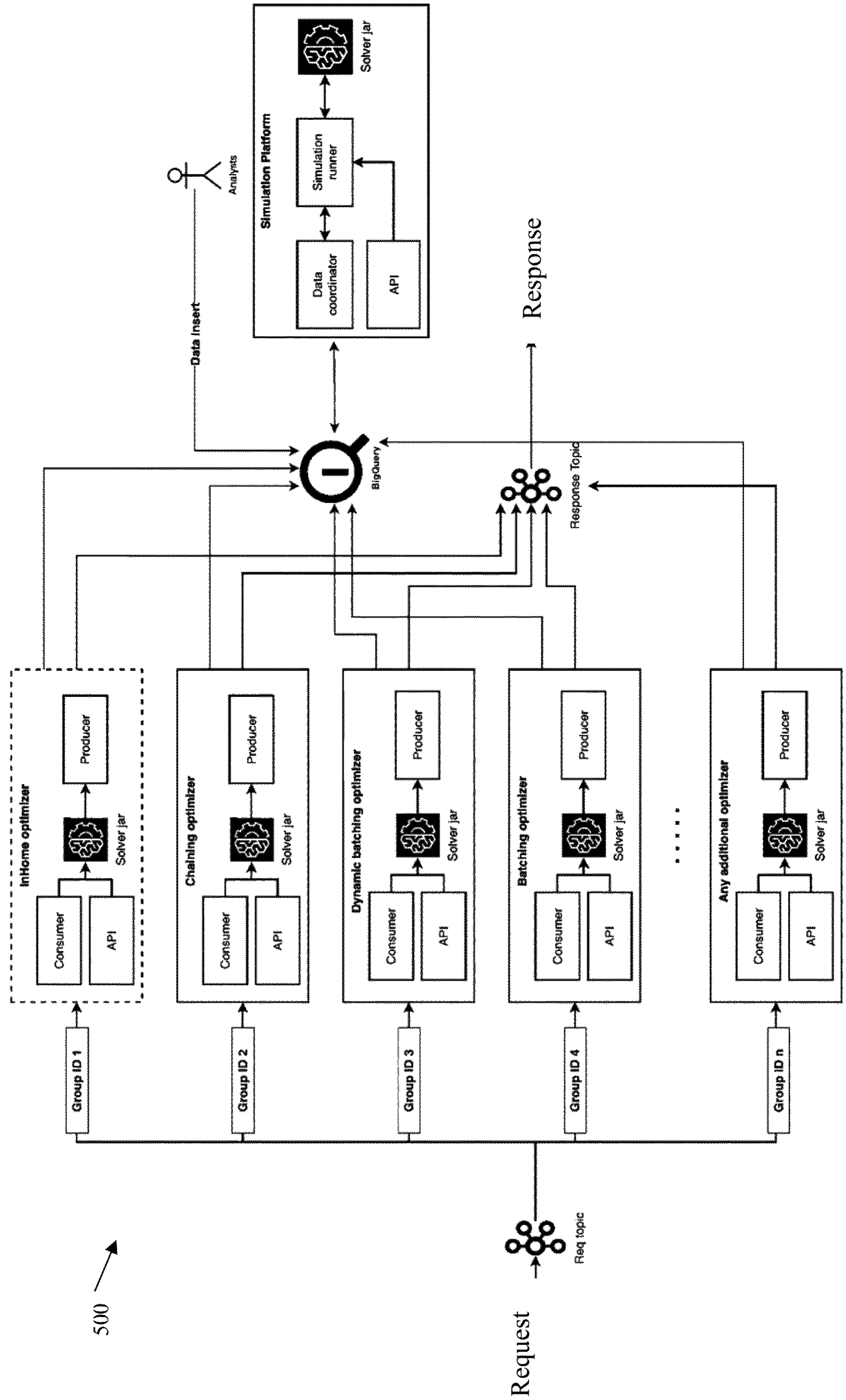
FIG. 5 illustrates an exemplary system architecture, according to certain embodiments.

Turning to FIG. 5, an exemplary system architecture 500 is illustrated, according to an embodiment. In the illustrated embodiment, a request is received. In some embodiments, the request corresponds to the activity 410 (FIG. 4) of receiving input information for generating one or more routes for one or more vehicles, the input information including one or more group classifiers. In the illustrated embodiment, the request is processed to determine a group identifier for the request. In some embodiments, processing the request corresponds to activity 420 (FIG. 4) of processing the input information based on the one or more group classifiers. In the illustrated embodiment, one of the optimizers is utilized to process the request based on the group identifier. In some embodiments, processing the request using one of the optimizers corresponds to activity 430 (FIG. 4) of analyzing, using one or more solving engines, the input information to generate the one or more routes for the one or more vehicles. In the illustrated embodiment, the system architecture 500 can operate in one or more stages. For example, the system architecture 500 can operate in two methods to run the application. In one embodiment, the system architecture 500 can consume Kafka messages, which refers to "consumer" in the system architecture 500. In another embodiment, the system architecture 500 can operate through HTTP POST API call, which refers to "API" in the system architecture 500. In some embodiments, "Solver jar" is the jar of core solver codes (e.g., one or more solving engines, solving service architecture). In some embodiments, "Producer" generates responses.

Figure 6:
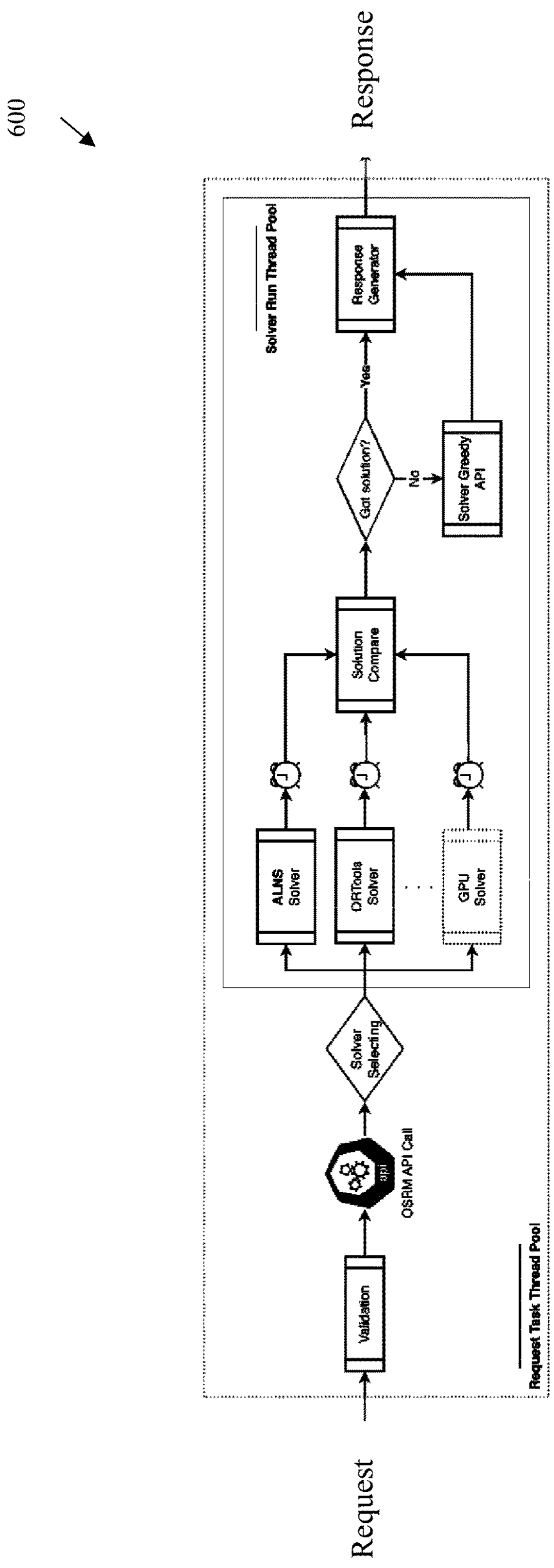
FIG. 6 illustrates an exemplary solving service architecture, according to certain embodiments.

Turning briefly to FIG. 6, a solving service architecture 600 is illustrated that can be utilized by one or more of the optimizers illustrated in the system architecture 500 (FIG. 5). In some embodiments, the solving service architecture 600 corresponds to activity 430 (FIG. 4) of analyzing, using one or more solving engines, the input information to generate the one or more routes for the one or more vehicles, and activity 440 (FIG. 4) of selecting, from each of the one or more solving engines, a vehicle route from the one or more routes that satisfies a threshold. In some embodiments, "Validation" is a logic unit to validate whether the data contained in the input request has a mistake. For example, if a mandatory field is missing, then the request cannot continue to be solved, leading to the failure of validation. In some embodiments, "OSRM API" can be called to get the pair-wise distance and time information. (e.g. the traveling distance and traveling time between any two locations, including order pickup location and order delivery location). In some embodiments, "Solver Selecting" is a logic unit to select appropriate solver engine based on group classifier in the input. "ALNS Solver", "ORTools Solver", "GPU Solver" are solver engines to generate the one or more routes for the one or more vehicles. "Solution Compare" is a logic unit to select the comparing the vehicle routes from each of the one or more solving engines to select a vehicle route from the one or more routes that satisfies a threshold. "Solver Greedy API" is a backup logic unit to guarantee generating feasible but less optimal routes in case none of the solving engines generate routes within given time limit. "Response generator" is call at the end to covert routes into JSON that can be consumed by the downstream system.

During operation the solving service architecture 600 can receive a request comprising input information for generating one or more routes for one or more vehicles, the input information including one or more group classifiers. The input will first be checked by the validation unit. If no mistake found, then address info of store and customers will be extracted and OSRM API calls will be invoked to retrieve the travel distance and time info between these addresses. The travel distance and time info, in together with the original input request will then be sent to solver engine(s) selected by the "Solver Selecting" based on the group classifiers in the original input. The selected Engine(s) are invoked to generate optimal routes within given time limits. Then the "Solution Compare" module will select out one or more routes that satisfies a threshold from the outcomes of selected solving engine(s). In some embodiments, a Solver Greedy API call will be invoked to provide other routes as backup if all the solving engine(s) are failed to provide routing solutions within the time limit. As the final stage, the "Response Generator" is invoked to convert routes into JSON format to be consumed by the downstream systems.

Figure 7:
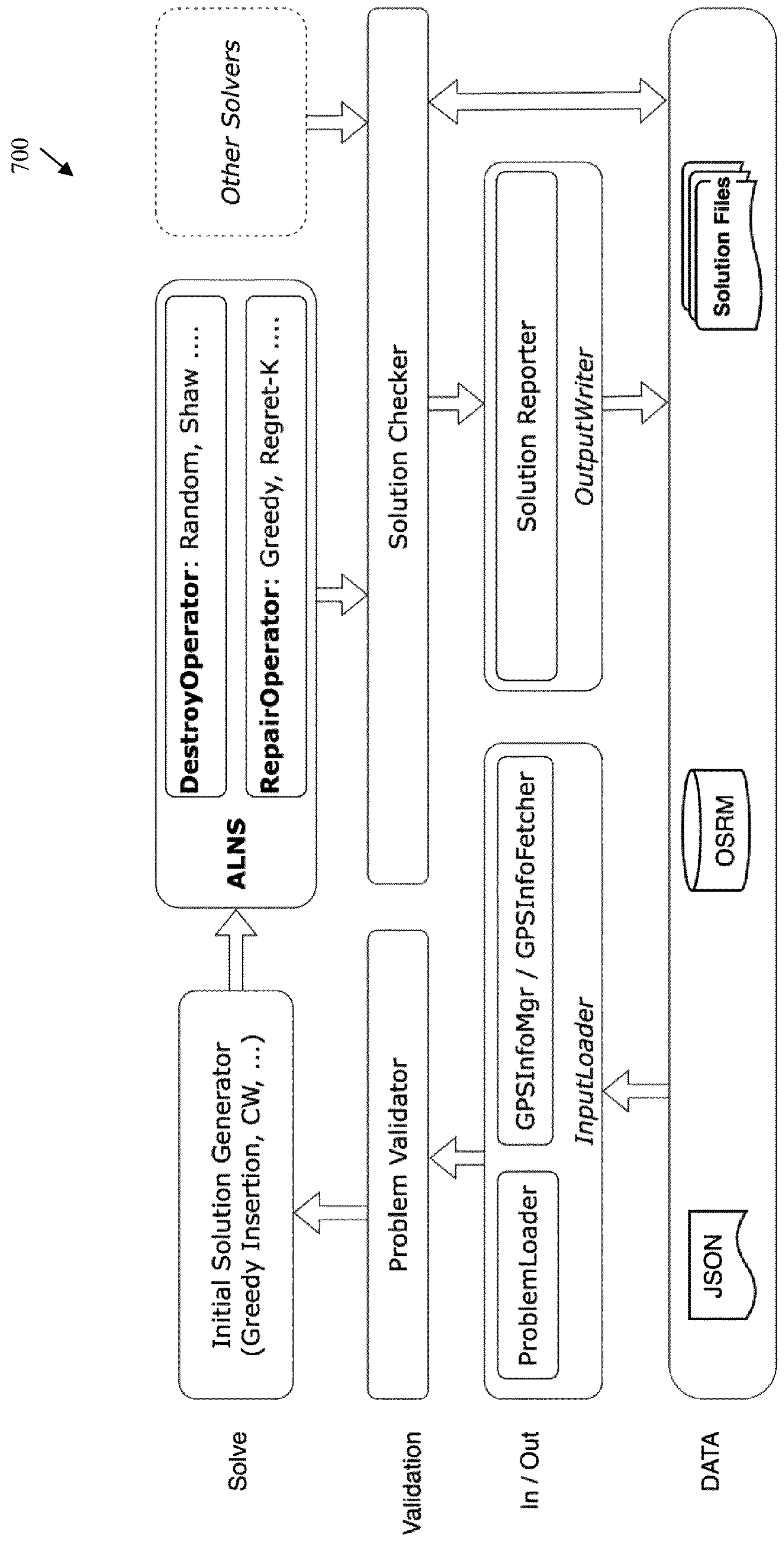
FIG. 7 illustrates an exemplary solving engine architecture, according to certain embodiments.

Turning briefly to FIG. 7, a solving engine architecture 700 is illustrated, according to an embodiment. In some embodiments, the solving engine architecture 700 corresponds to activity 430 (FIG. 4) of analyzing, using one or more solving engines, the input information to generate the one or more routes for the one or more vehicles, and activity 440 (FIG. 4) of selecting, from each of the one or more solving engines, a vehicle route from the one or more routes that satisfies a threshold. During operation the solving engine architecture 700 can receive a input request to generate routes in JSON format, which is then converted by "ProblemLoader" into a data object representing a routing problem. In some embodiments, the "GPSInfoMgr/GPSInfoFetcher" is invoked to retrieve the travel distance and time info between addresses in the input. The routing problem data object will be validated by the "Problem Validator". If no mistake found, it will then be solved. In the illustrated embodiment, a two-step ALNS approach is shown: an initial solution will first be generated by the Initial Solution Generator using some construction logic (e.g., Greedy Insertion, CW methods, etc.), then the ALNS will be invoked to improve the solution, in which various DestroyOperators (Random, Shaw, etc.) will be used to revise parts of the routes, and RepairOperators (Greedy, Regret-K, etc.) will then try to rebuild the routes. If any improved routes are found during the search, they will be kept. Such a search will iterate for many times until some stopping criteria are triggered (e.g., time limit reaches, or no more improvement are observed in last X iterations. Then the solution will be check for its validity by "Solution Checker". The validated solution is then converted by "Solution Reported" into response JSON and is output by the "Output Writer" to downstream system(s) (here we use solution files in the chart for illustration).

Returning to FIG. 5, the system architecture 500 includes a simulation platform that is configured to process input information based on the method 400 (FIG. 4). For example, an analysts can generate input information that can be simulated using the activities of method 400 (FIG. 4) for the analyst to review prior to being transmitted to a dispatcher.

Returning to FIG. 3, in several embodiments, communication system 311 can at least partially perform activity 410 (FIG. 4), and/or activity 450 (FIG. 4).

In several embodiments, evaluation system 312 can at least partially perform activity 420 (FIG. 4).

In a number of embodiments, analysis system 313 can at least partially perform activity 430 (FIG. 4) and/or activity 440 (FIG. 4).

In a number of embodiments, web server 320 can at least partially perform method 400.

Although systems and methods for vehicle route analysis have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Embodiments disclosed herein are directed to analyzing user orders, delivery vehicle information, and store locations to determine an optimized listing of routes for the vehicles to make deliveries to the users. Embodiments disclosed herein are directed to a scalable solving framework, multiple solver parallelization support and layered backup features. Embodiments disclosed herein improve upon existing solutions by utilizing an initial solution and iteratively transforming the current solution into a candidate solution using destroy and repair operators. Embodiments disclosed herein also improve the search efficiency and generation of vehicle routes compared to previous solutions, thereby improving the technical field of vehicle route selection.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:
- one or more processors; and
- one or more non-transitory computer-readable media storing computing instructions that, when run on the one or more processors, cause the one or more processors to perform:
- receiving input information for generating one or more routes for one or more vehicles, the input information including one or more group classifiers;
- using, before invoking Open Source Routing Machine (OSRM) application programming interface (API) calls, a validation unit to validate the input information;
- selecting, based on a group classifier of the one or more group classifiers, one or more solving engines, from a plurality of solver engines, that generate one or more routes that are more optimal than routes generated by a solver greedy application programming interface (API);
- generating the one or more routes, for the one or more vehicles, by sending, to the one or more solving engines, the input information and information obtained by invoking the OSRM API calls based on using the validation unit to validate the input information and based on selecting the one or more solving engines;
- selecting, after the one or more solving engines generate the one or more routes, a vehicle route from the one or more routes; and
- causing a vehicle, of the one or more vehicles, to operate along the vehicle route, by transmitting information regarding the vehicle route in a JSON format that is consumable by a downstream system associated with the vehicle.

2. The system of claim 1, wherein the input information includes order information, vehicle information, and store information.

3. The system of claim 1, wherein the one or more group classifiers include in-home, chaining, or dynamic batching.

4. The system of claim 1, wherein the one or more solving engines include at least one of an Adaptive Large Neighborhood Search (ALNS) solver, an optimization solver, or a generic neighborhood search solver.

5. The system of claim 4, wherein the one or more solving engines are operated in parallel.

6. The system of claim 4, wherein the ALNS solver includes a destroy operator and a repair operator.

7. The system of claim 1, wherein generating the one or more routes comprises:
- receiving vehicle routes from each of the one or more solving engines; and
- comparing the vehicle routes from each of the one or more solving engines.

8. The system of claim 1, wherein causing the vehicle to operate along the vehicle route comprises:
- generating a scheduling of vehicles for each of the one or more vehicles to operate along the plurality of vehicle routes.

9. A method, the method comprising:
- receiving input information for generating one or more routes for one or more vehicles, the input information including one or more group classifiers;
- using, before invoking one or more application programming interface (API) calls, a validation unit to validate the input information;
- selecting, based on a group classifier of the one or more group classifiers, one or more solving engines, from a plurality of solver engines, that generate one or more routes that are more optimal than routes generated by a solver greedy application programming interface (API);
- generating, based on using the validation unit to validate the input information and based on selecting the one or more solving engines, the one or more routes, for the one or more vehicles, by using the one or more solving engines to analyze the input information and information obtained by invoking the one or more API calls;
- selecting, after generating the one or more routes, a vehicle route from the one or more routes; and
- causing a vehicle, of the one or more vehicles, to operate along the vehicle route by transmitting information regarding the vehicle route.

10. The method of claim 9, wherein the input information includes order information, vehicle information, and store information.

11. The method of claim 9, wherein the one or more group classifiers include in-home, chaining, or dynamic batching.

12. The method of claim 9, wherein the one or more solving engines include at least one of an Adaptive Large Neighborhood Search (ALNS) solver, an optimization solver, or a generic neighborhood search solver.

13. The method of claim 12, wherein the one or more solving engines are operated in parallel.

14. The method of claim 12, wherein the ALNS solver includes a destroy operator and a repair operator.

15. The method of claim 9, wherein generating the one or more routes comprises:
- receiving vehicle routes from each of the one or more solving engines; and
- comparing the vehicle routes from each of the one or more solving engines.

16. The method of claim 9, further comprising:
- generating a scheduling of vehicles for the one or more vehicles to operate along a plurality of vehicle routes that include the one or more routes.

17. A non-transitory computer readable storage medium storing one or more computing instructions that, when run on one or more processors, cause the one or more processors to:
- receive input information that includes information regarding one or more group classifiers;

use, before invoking one or more application programming interface (API) calls, a validation unit to validate the input information;

select, based on a group classifier of the one or more group classifiers, one or more solving engines that are configured to generate routes that are more optimal than other routes generated by a solver greedy application programming interface (API);

select a vehicle route based on selecting the one or more solving engines and after using the validation unit to validate the input information; and cause a vehicle to operate along the vehicle route by transmitting information regarding the vehicle route in a format that is consumable by a downstream system associated with the vehicle.

18. The non-transitory computer readable storage medium of claim 17, wherein the vehicle route is selected based on the vehicle route utilizing less resources than any other vehicle route of the routes.

19. The non-transitory computer readable storage medium of claim 17, wherein the one or more computing instructions further cause the one or more processors to:

invoke the solver greedy API to generate the other routes based on the one or more solving engines failing to provide information regarding the routes within a time limit; and select the vehicle route from the other routes.

20. The non-transitory computer readable storage medium of claim 17, wherein the one or more computing instructions further cause the one or more processors to:

invoke the one or more API calls to retrieve distance information and time information; and sending the input information, the distance information, and the time information to the one or more solving engines after selecting the one or more solving engines.

* * * * *